US007185335B2

(12) United States Patent
Hind et al.

(10) Patent No.: US 7,185,335 B2
(45) Date of Patent: Feb. 27, 2007

(54) PROGRAMMATIC APPLICATION INSTALLATION DIAGNOSIS AND CLEANING

(75) Inventors: John R. Hind, Raleigh, NC (US); Youngcheng Li, Raleigh, NC (US); Chunshan A. Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 10/247,202

(22) Filed: Sep. 19, 2002

(65) Prior Publication Data

US 2004/0060045 A1    Mar. 25, 2004

(51) Int. Cl.
*G06F 9/445* (2006.01)
(52) U.S. Cl. ............... 717/176; 717/174; 717/175; 717/177; 717/178; 717/170; 717/171; 717/172
(58) Field of Classification Search ......... 717/168–178
See application file for complete search history.

(56) References Cited

U.S. PATENT DOCUMENTS

| | | | | |
|---|---|---|---|---|
| 6,023,586 | A * | 2/2000 | Gaisford et al. | 717/178 |
| 6,151,643 | A * | 11/2000 | Cheng et al. | 710/36 |
| 6,282,711 | B1 * | 8/2001 | Halpern et al. | 717/175 |
| 6,314,565 | B1 * | 11/2001 | Kenner et al. | 717/171 |
| 6,453,469 | B1 * | 9/2002 | Jystad | 717/174 |
| 6,457,076 | B1 * | 9/2002 | Cheng et al. | 710/36 |
| 6,698,018 | B1 * | 2/2004 | Zimniewicz et al. | 717/175 |
| 6,744,450 | B1 * | 6/2004 | Zimniewicz et al. | 717/175 |
| 6,763,403 | B2 * | 7/2004 | Cheng et al. | 710/36 |
| 6,910,208 | B1 * | 6/2005 | Zimniewicz | 717/174 |
| 2003/0046675 | A1 * | 3/2003 | Cheng et al. | 717/173 |
| 2003/0046676 | A1 * | 3/2003 | Cheng et al. | 717/173 |
| 2003/0145317 | A1 * | 7/2003 | Chamberlain | 717/177 |
| 2003/0167354 | A1 * | 9/2003 | Peppers et al. | 709/327 |
| 2003/0221190 | A1 * | 11/2003 | Deshpande et al. | 717/171 |

(Continued)

OTHER PUBLICATIONS

*Autonomic Computing: IBM's Perspective on the State of Information Technology*, IBM Corp., (Oct. 2001).

(Continued)

*Primary Examiner*—Kakali Chaki
*Assistant Examiner*—William H. Wood
(74) *Attorney, Agent, or Firm*—Jeanine S. Ray-Yarletts, Esq.; Steven M. Greenberg; Carey, Rodriguez, Greenberg & Paul, LLP (57) ABSTRACT

A plugable framework for use in the installation and uninstallation of a suite of applications. An application installer configured according to the plugable framework can include installation logic configured to copy application files to a target computing system. The installation logic also can configure the target for operation with the application. Installation diagnostic and cleanup logic can be coupled to the installation logic. The installation diagnostic logic can detect an installation failure, while the cleanup logic can remove the copied files and can reverse the configuration in response to the installation diagnostic logic detecting an installation failure. Uninstallation logic can be configured both to remove copied files from the target, and also to reverse the configuration of the target according to the terms of a specified uninstallation configuration file. In response to the detection of an uninstallation failure, cleanup logic can remove the copied files and can reverse the configuration without regard to the uninstallation configuration file.

11 Claims, 4 Drawing Sheets

U.S. PATENT DOCUMENTS

2004/0015946 A1* 1/2004 Te'eni et al. ............... 717/169

OTHER PUBLICATIONS

*Software Distribution Over the Internet, InstallShield Professional 6.2*, InstallShield Corp., (2000).

B. Bahlmann, *Installation Automation, Birds-Eye.net* <http://www.birds-eye.net/technical_archive/installation_automation_project.htm>, (Aug. 23, 1996).

*Installation Scripts: Guidelines for Developers at MIT*, <http://web.mit/edu/is/integration/doc/inst_guidelines.html>, (Aug. 20, 2002).

R. Merritt, *Distributed Computing Shifts Focus to Self-Managed Systems, EETimes*, <http://www.eetimes.com/printable_Article?doc_id=OEG20020412S0056>, (Apr. 12, 2002).

*Java Specification Requests*, <http://www.jcp.org/jrs/detail/38.prt>, (Aug. 20, 2002).

* cited by examiner

PROGRAMMATIC APPLICATION INSTALLATION DIAGNOSIS AND CLEANING

BACKGROUND OF THE INVENTION

1. Statement of the Technical Field

The present invention relates to the field of application installation and uninstallation, and more particularly to detecting and curing application installation and unstallation failures.

2. Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

In contrast to the process of installing an application, uninstalling an application, in an era of complex software applications, requires an equally as sophisticated uninstallation process. In that regard, while it can be a simple enough task simply to delete those files from the computing system which are associated with the uninstalled application, in many cases, the files which are to be deleted are requisite to the operation of other applications which are not to be deleted—namely application libraries and such. Also, to the extent that the computing system had been configured for operation with the deleted application, the configuration data ought to be removed from the computing system. Typically, the complete removal of configuration data in the course of an uninstallation process will require further editing of the system registry, one or more system initialization files, or both.

At the outset of an uninstallation process, it is assumed by the uninstallation process that the application to be uninstalled at least had been successfully installed some time prior to the initiation of the uninstallation process. That is to say, in order to effectively remove application files and configuration settings which ought to have been installed in a complete manner some time in the past, it is assumed that indeed the application files and configuration settings were installed in a complete manner. Of course, as will be recognized by one skilled in the art, the complete installation of application files and configuration settings can never be guaranteed as the installation process often fails for a variety of reasons, including missing dependencies, inadequate system resources, power outages, file and system resource access restrictions, and missing installation files.

In the context of single system application installations, the issue of a failed installation can be handled to the extent that the failed installation will be apparent to the installer and the application simply can be reinstalled. Moreover, various commercial tools have been developed to uninstall previously partially installed applications. More particularly, such commercial tools typically scan registry entries and the entries of system configuration files seeking out unaffiliated fragments. Such fragments can be removed as can unaffiliated application libraries which seemingly have not been accessed by any one application in recent memory.

While the conventional process of handling failed installations and uninstallations can suffice for single system applications, in the context of bundled application suites formed from the dynamic composition of multiple independently installed applications, installations can fail more frequently, particularly where pre-requisite applications are missing from the target host. Also, as each application component can be independent of other application components in the application suite or set, it can be difficult even to detect an improperly installed portion of the application suite. In that regard, the individual application components of a bundled suite of applications often lack installation and uninstallation logic. In an era of autonomic computing and Web services, however, computing devices are meant to be "self-configuring", "self-managing" and "self-healing".

SUMMARY OF THE INVENTION

In accordance with the inventive arrangements, a plugable framework can be provided for use in the installation and uninstallation of a suite of applications. The plugable framework can include a set of self-supplied services defined by a unified interface. The set of services can include a pre-requisite check, a meta-data reporter, an application installer and an application uninstaller, installation and uninstallation diagnostic processors, a functional diagnosis engine, and a cleanup processor. Through a unified implementation of the set of services in each application in the suite, an individual application which has been bundled within the suite can invoke the set of services directly throughout the interface to facilitate autonomic installation and uninstallation behavior.

The present invention includes an application installer which has been configured to install an application to a target computing system. The application installer can include installation logic configured to copy application files to specified locations in the target computing system. The installation logic also can configure the target computing system for operation with the application. Installation and functionality diagnostic logic also can be coupled to the installation logic. Finally, pre-requisite check logic and cleanup logic can be coupled to the installation logic.

The pre-requisite check logic can identify application components required for the installation of an associated application component. The installation diagnostic logic can detect an installation failure resulting from the installation of the application component. The functionality diagnostic logic, by comparison, can detect a failure for the installed application components to perform functionally, notwithstanding the installation of the application component. Finally, the cleanup logic can remove the copied application files and can revert the configuration of the target computing system in response to the installation diagnostic logic detecting an installation failure.

Importantly, the application installer also can include uninstallation logic configured to remove copied application files from specified locations in the target computing system, and to reverse the configuration of the target computing system according to the terms of a specified uninstallation configuration file. Uninstallation diagnostic logic can be coupled to the uninstallation logic, as cleanup logic can be coupled to the uninstallation logic. The uninstallation diagnostic logic can detect an uninstallation failure. By comparison, in response to the uninstallation diagnostic logic detecting an uninstallation failure, the cleanup logic can remove the copied application files and can reverse the configuration of the target computing system without regard to the uninstallation configuration file.

A method of installing an application program to a target computing system can include, in a first installation process, the steps of copying applications files of the application program to specified locations in the target computing system, and configuring the target computing system as required for the operation of the application program. In a second installation process which is separate from the first installation process, the method can include the steps of diagnosing the copying and configuring steps to determine whether the application program has been installed successfully; and, if in the diagnosing step it is determined that the application program has not been installed successfully, performing a cleanup process to remove the copied application files and to reverse the configuration.

Notably, in a preferred aspect of the invention, dependent applications can be identified whose installation is required for the operation of the application program. In consequence, each identified dependent application can be installed before installing the application program. The diagnosing step also can include identifying a set of application files which, for a successful installation of the application program, are to be copied to specified locations in the target computing system. Configuration settings further can be identified which are required in the target application system for the correct operation of the application program. At least one failure can be detected—namely a failure to copy the set of application files to the specified location, and/or a failure to correctly establish the system configuration systems.

The method also can be used to properly and autonomically uninstall an installed application program. Specifically, in a first uninstallation process, the application program can be uninstalled. More particularly, the uninstallation can include the steps of removing the copied application files, and reversing the configuration according to a specified installation configuration file. In a second uninstallation process, the removing and reversing steps can be diagnosed to determine whether the application program has been uninstalled successfully. If in the diagnosing step of the second uninstallation process it is determined that the application program has not been uninstalled successfully, a cleanup process can be performed to remove remaining application files and to reverse the configuration without regard to the specified installation configuration file.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

In accordance with the inventive arrangements a plugable framework can be provided for use in the installation and uninstallation of a suite of applications. The plugable framework can include a set of self-supplied services defined by a unified application programming interface (API). The set of services can include a pre-requisite check, a meta-data reporter, an application installer and an application uninstaller, installation and uninstallation diagnostic processors, a functional diagnosis engine, and a cleanup processor. Through a unified implementation of the set of services in each application in the suite, an individual application which has been bundled within the suite can invoke the set of services directly under the API to facilitate autonomic installation and uninstallation behavior.

In accordance with the inventive arrangements, through logic defined by the framework, the requisite applications in a suite can be identified and installed so as to ensure the proper installation of a suite of dependent applications without requiring either manual intervention or underlying knowledge of the dependent applications. Rather, a meta-data reporter can identify the required specifications of an associated application and a pre-requisite checker can identify those dependent applications required for the proper installation and operation of an associated application. The success of the installation of each application can be diagnosed physically through an installation diagnostic processor. Conversely, the success of the uninstallation of an application can be diagnosed through an uninstallation diagnostic processor.

Notably, the functionality of an installed application can be diagnosed through a functional diagnosis engine. Based upon the diagnosis of the installation and functional diagnostic processors, to the extent that an installation process fails for any one application in the suite, the installation of the suite can be rolled back to a state which existed prior to the installation process. Similarly, based upon the diagnosis of the uninstallation processor, to the extent that an uninstallation process fails for any one application in the suite, a clean up process can proceed to roll back the system state without regard to the specific installation configuration of the uninstalled application.

Specifically, the cleanup process can roll back the configuration of the target computing system to a state which existed prior to the installation of the application. Hence, while a nominal uninstallation process can rely upon detailed user installation configuration data generated through a successful installation, the cleanup process of the present invention need not rely upon access to user installation configuration data. Rather, the cleanup process of the present invention can access the configuration data for a target computing system, such as the set of entries in a system registry.

Based upon the knowledge of the requirements for the installation of the application, entry values can be removed or modified, and system variables can be returned to a state which existed prior to the installation of the application. Optionally, the process of modifying and removing system entries and entry values can be assisted through the manual intervention of an operator. Specifically, registry values can be reported to the operator and, based upon the decision-making of the operator, entries can be modified or removed.

Figure 1:
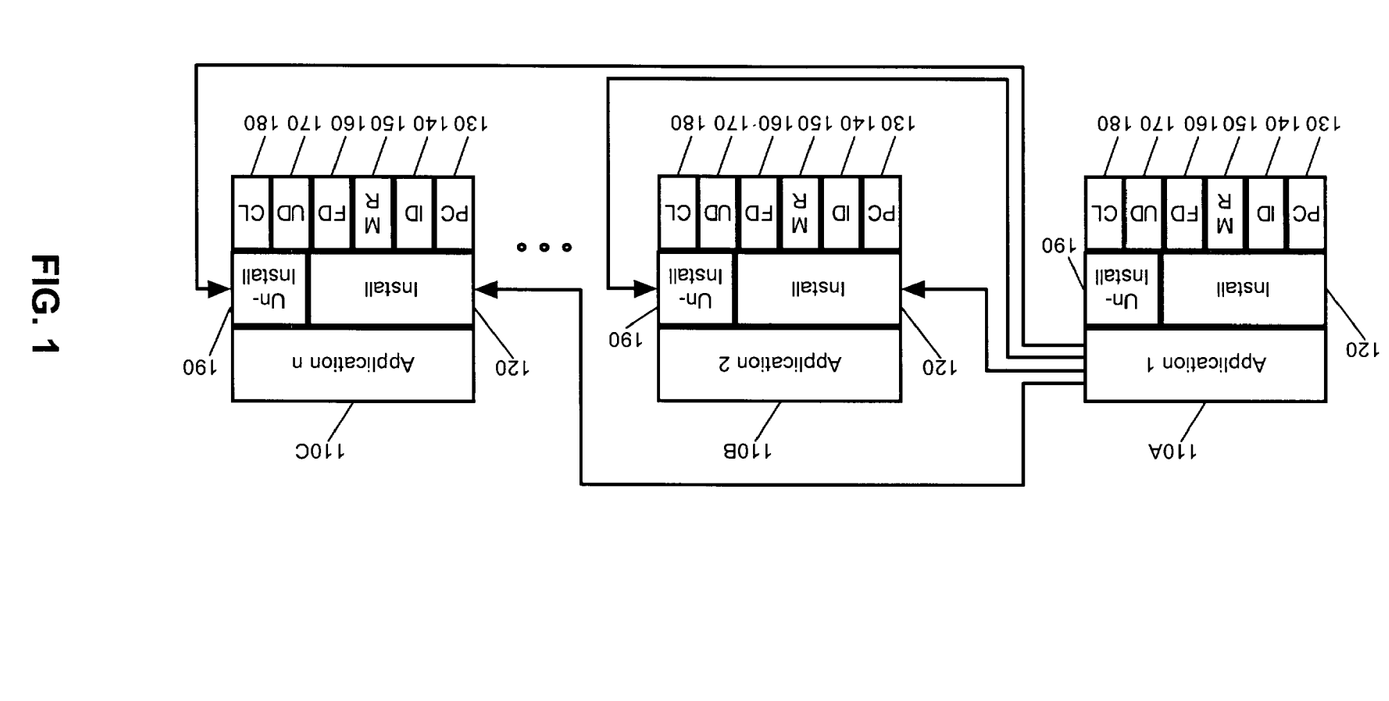
FIG. 1 is a block diagram illustrating a suite of applications which have been configured to perform automatic installation diagnosis and cleanup in accordance with the inventive arrangements.

FIG. 1 is a block diagram illustrating a series of applications which have been configured in accordance with the plugable framework of the present invention. Specifically, as shown in FIG. 1, a primary application 110A and dependent applications 110B, 110C can be installed in accordance with the inventive arrangements. In particular, in order for application 110A to function properly, it will be required that application 110B and application 110C are properly installed. Thus, applications 110B and 110C can be said to be a "dependencies" of application 110A and are a prerequisite to the proper operation of application 110A.

Each of the applications 110A, 110B, 100C can be configured with plugable installation logic 120 and plugable uninstallation logic 190. The functionality of the installation logic 120 can be accessed through an interface which includes prototypes for a prerequisite check 130, installation diagnostics 140, a meta-data reporter 150, and functional diagnostics 160. Similarly, the functionality of the uninstallation logic 190 can be accessed through an interface which includes prototypes for uninstallation diagnostics 170 and a cleanup process 180. Importantly, the prototypes of the uninstallation logic 190 can be accessed through the installation logic 120 for example where a defective installation requires the cleaning up of the system.

When undertaking the installation of a suite of applications, including application 110A, first the resource requirements of the application 110A can be compared to the available resources in the target computing system. Subsequently, a pre-requisite check provided by the installation logic 120 can identify the required dependencies—applications 110B and 110C. Having identified the dependent applications 110B, 110C, the installation logic 120 of application 110A can invoke an installation process associated first with application 110B and subsequently with application 110C.

For each of the applications 110A, 110B and 110C in the application suite, the meta-data reporter 150 can specify available functionality, versioning data, release date, feature set, and the like. Also, installation diagnostics 140 can determine at the outset the resource requirements of the respective application 110A, 110B, 110C, and can compare those requirements to the available resources in the target computing system. So long as the requirements can be met by the target computing system, the pre-requisite check 130 can identify required dependencies.

Once all dependencies identified in the pre-requisite check 130 have been installed, the application itself can be installed. Thus, in the exemplary case shown in FIG. 1, once the dependent applications 110B, 110C have been successfully installed, the application 110A can be installed, which ordinarily would involve moving files to a specified directory or directories, and configuring the target system, for example by modifying, removing or adding entries to a system registry. Subsequently, installation diagnostics 140 can inspect the configuration of the target system and the file structure of the target system to ensure that the requisite files have been transferred and that the target computing system has been properly configured. Also, functional diagnostics 160 can test the functionality of the installed application to ensure that the functionality of the application 110A, 110B, 110C can satisfy its intended purpose.

Where both the installation diagnostics 140 and the functional diagnostics 160 determine that the application 110A has been properly installed (which would require the proper installation of applications 110B, 110C), such an indication can be provided to the calling application and the installation of the application suite can conclude. In the event where the either the installation diagnostics 140 or the functional diagnostics 160 determines that the application 110A (or the dependencies 110B, 110C, for that matter) have not been properly installed, a failure condition can arise and the cleanup process 180 of the uninstallation logic 190 can be invoked to clean the target system not only of already transferred files associated with the installation of the application suite, but also the configuration settings undertaken during the installation process can be removed or rolled back to a prior state.

More particularly, in the event that the cleanup process 190 is invoked, the system configuration can be remediated to a state which existed prior to the installation of the application suite. Importantly, as the cleanup process 190 can access the installation requirements of a respective application, the cleanup process can automatically purge system configuration entries such as registry entries without knowing the precise state of the installation of the application as would ordinarily be provided in a user installation configuration file. In this way, the state of the installation of an application can be monitored, and, upon diagnosing an installation failure, the cleanup process 190 can be undertaken without requiring operator intervention—a requirement of self-configuring, self-managing and self-healing autonomic computing systems.

Figure 2:
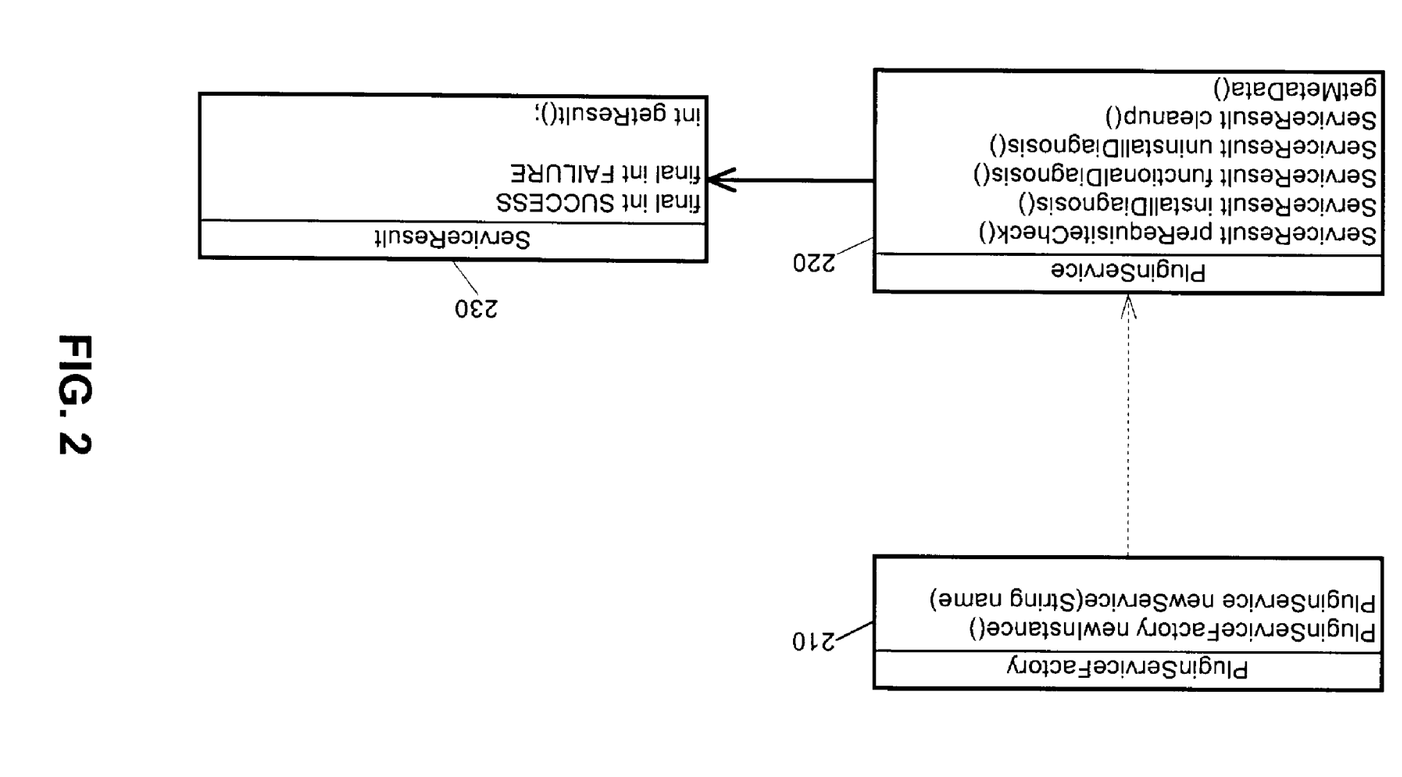
FIG. 2 is a class diagram illustrating an exemplary object-oriented interface for implementing a plugable installation and uninstallation diagnosis and clean up system; and, FIGS. 3A and 3B, taken together, are a flow chart illustrating a process of automatically diagnosing the installation and uninstallation of an application and performing cleanup in accordance with the inventive arrangements.

FIG. 2 is a class diagram illustrating an exemplary object-oriented interface for extending a plug-in service to process automatic installation diagnosis and clean up. Specifically, a plug-in service factory 210 can be configured to create new instances of a plug-in service 220 able to extend application components in a suite of applications to perform the application installation and uninstallation processes of the present invention. As it will be apparent to the skilled artisan, the term application can be applied broadly not merely to include stand-alone executables, but also to include interpretable and network-distributable logic, and components of distributed systems such as Web services.

In any case, in addition to the methodology and data ordinarily included in a plug-in service 220, logic for implementing installation and uninstallation can be included. Notably, the result of any one method implemented as part of the installation or uninstallation logic can be provided uniformly through a service result 230. In accordance with the inventive arrangements, the plug-in service 220 can define prototype interfaces for a pre-requisite check, installation diagnostics, functional diagnostics, uninstallation diagnostics, a cleanup process, and a meta-data reporter.

For example, as shown in FIG. 2, a getMetaData( ) method member can return meta-data describing the feature and functionality set of an associated application component, such as versioning data, release date data, the core set of functions supported by the application component, etc. A preRequisiteCheck( ) method member, by comparison, can identify those dependencies whose installation and proper functional operation will be requisite to the operation of the application. An installDiagnosis( ) method member can determine not only the computing resources required for the proper installation of the application, but also, the installDiagnosis( ) method member can ensure that all specified files required for the operation of the application have been written to the appropriate location within the file structure of the target computing system and that the target computing system has been configured properly. A functionalDiagnosis( ) method member, in contrast to the installDiagnosis( ) method member, can ensure that the application component, once installed, has the proper functionality required to conclude that the application has been successfully installed.

In the context of a commanded uninstallation, an uninstallDiagnosis( ) method member can ensure that all installed files for the application have been removed from the appropriate locations within the file structure of the target computing system and that the configuration of the target computing system has been restored to a state which would exist in the absence of the application. To the extent that either an installation of the application, or an uninstallation of the application, is determined to have failed, a cleanup( ) method member can undertake the cleansing of the target computing system without regard to an installation configuration file which may have been generated in the course of a proper installation.

More particularly, automatically upon detecting a failure in the process of installing or uninstalling the application 220, the cleanup( ) method member can be invoked in a self-healing manner. Not having access to an installation configuration file ordinarily produced in the course of a proper installation of a plug-in service, by way of access to the installation requirements of the application 220, the cleanup( ) method member can ensure that all installed files for the application have been removed from the appropriate locations within the file structure of the target computing system. Furthermore, the cleanup( ) method member can ensure that the configuration of the target computing system has been restored to a state which would exist in the absence of the application component.

Figure 3A:
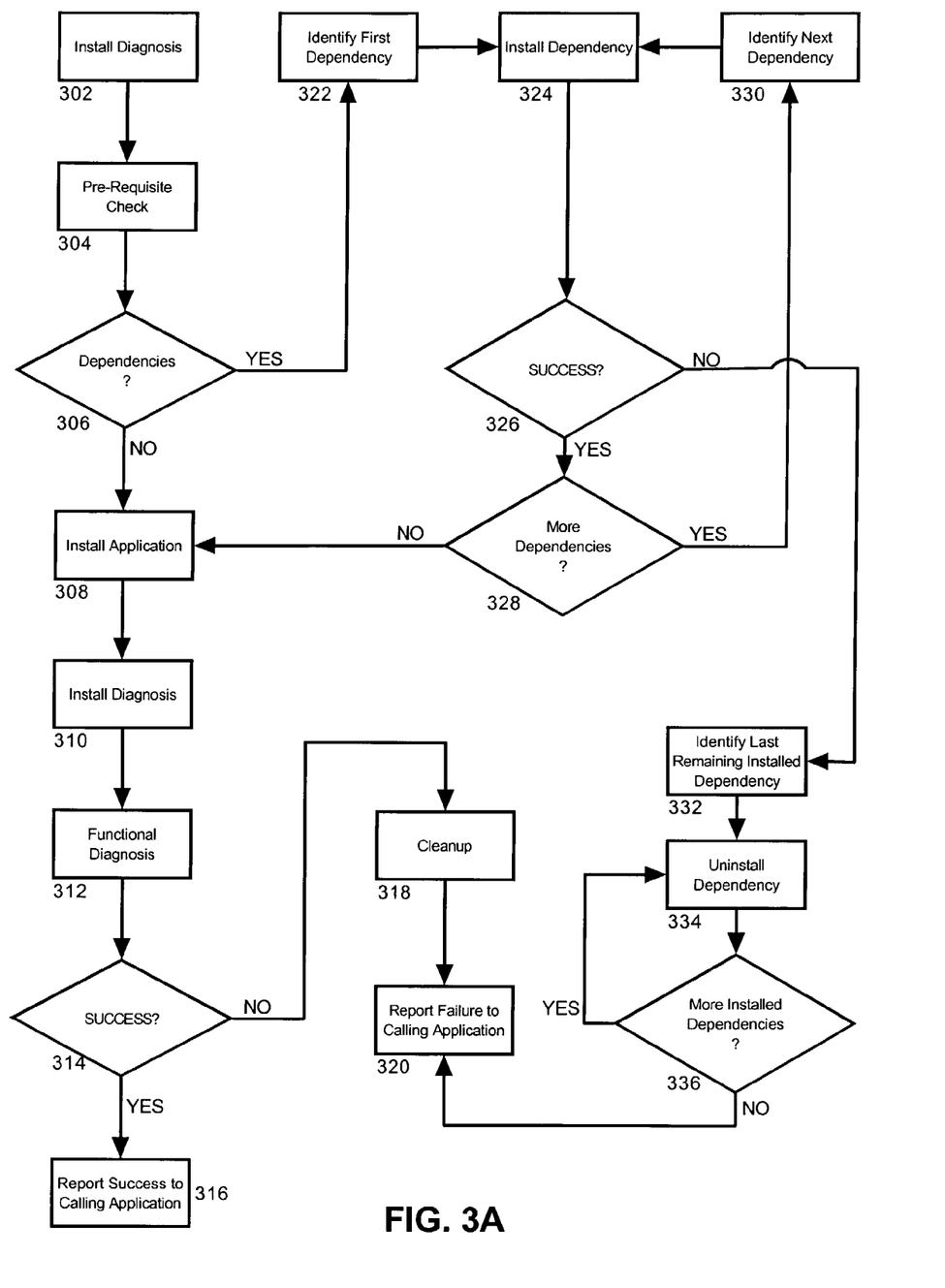
Figure 3B:
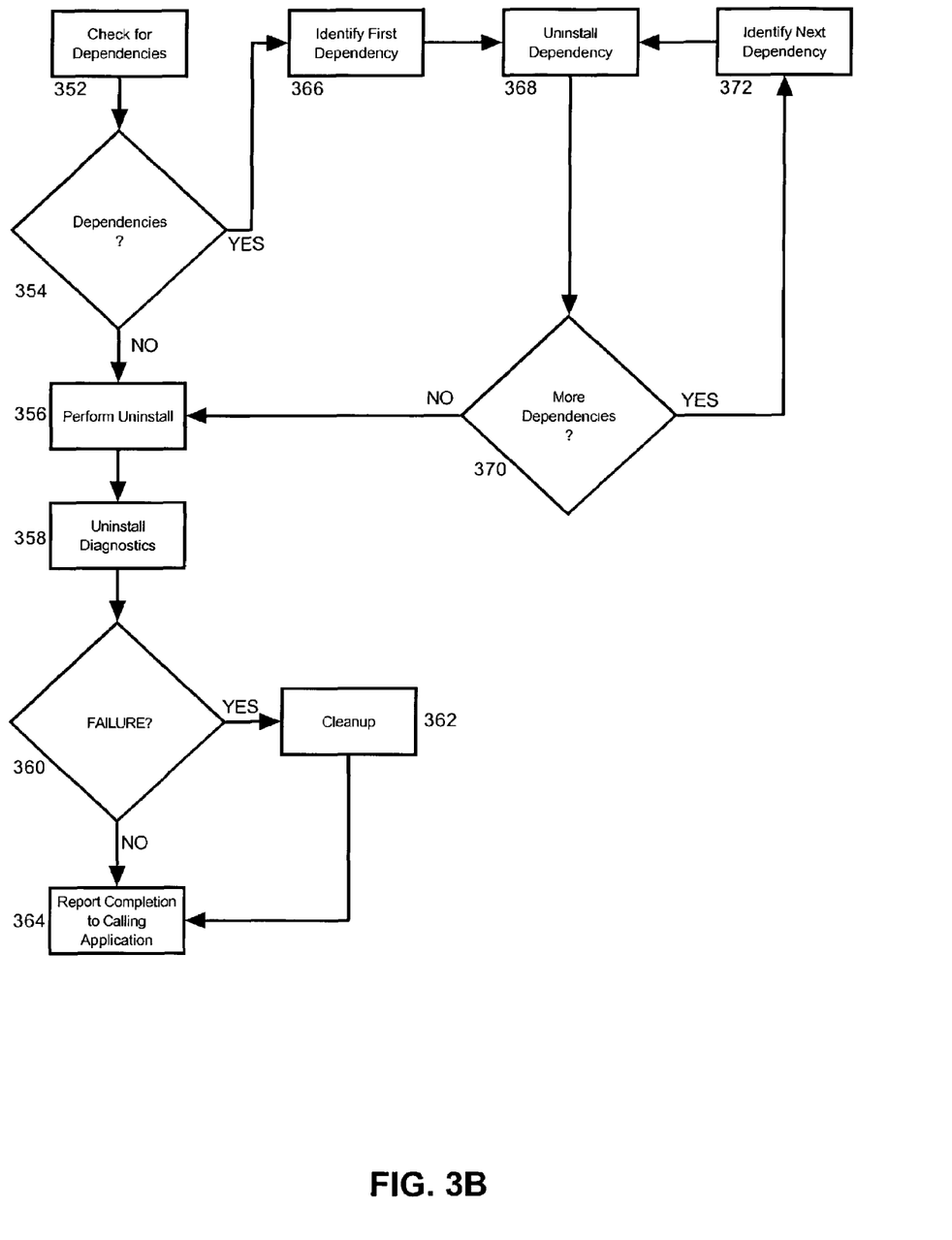

FIGS. 3A and 3B, taken together, are a flow chart illustrating a process of automatically diagnosing the installation and uninstallation of an application and performing cleanup in accordance with the inventive arrangements. Specifically, FIG. 3A illustrates an installation process, while FIG. 3B illustrates an uninstallation process. Beginning first with FIG. 3A, responsive to a request to install an application, in block 302 an installation diagnostic process can identify the system requirements of the installation and can compare the requirements to the system capabilities of the target computing system. Specifically, pre-requisite system conditions can be determined for the application, and system configuration data can be identified for the target computing system. The pre-requisite system conditions can be compared with the system configuration data. Optionally, the comparison can be reported to an end user.

In block 304, a pre-requisite check can be performed to determine whether the installation of the application depends upon the installation of other applications. In decision block 306, if the pre-requisite check reveals no dependencies, in block 308, the application can be installed—namely application files can be placed in appropriate locations within the target computing system file structure. Additionally, the configuration of the target computing system can be modified as need be according to the requirements of the application.

In block 310, an installation diagnosis again can be performed to determine whether the application installation of block 308 has completed successfully. Specifically, the diagnosis can determine whether all requisite files have been copied as specified by the installation process, and whether the system has been configured properly, again, according to the installation process. Notably, in block 312, a functional diagnosis can be performed in which the requisite functionality of the installed application can be tested to ensure that the application has been installed properly. In decision block 314, if the installation and functional diagnosis proves successful, in block 316 a successful installation can be reported to the process which initiated the application installation. Otherwise, in block 318, a cleanup process can be performed and in block 320, a failure condition can be reported to the process which initiated the application installation.

Importantly, in decision block 306, if the installation of the application is determined to depend upon the installation of other applications, in block 322, the first dependency can be identified, and in block 324 the dependent application can be installed using the same process within the dependent application as described herein in blocks 302 through 316. In decision block 326, if the installation of the dependent application is successful, it can be determined in block 328 whether additional dependent applications remain to be installed. If so, the next dependent application can be identified in block 330 and the process of installing dependent applications can continue through blocks 324 through 330. Otherwise, once all dependent applications have been installed, the principal application can be installed in accordance with steps 308 through 320.

To the extent that the installation of one or more of the dependent applications fails to complete successfully in steps 322 through 330, in block 332, the installation of the dependent applications and primary application can be aborted and the already installed dependent applications can be uninstalled. Specifically, in block 332 the last remaining installed dependent application can be identified and in block 334 the dependent application can be uninstalled. The process can be repeated through block 336 for each identified dependent application in reverse order of installation. Once complete, in block 320 a failure condition can be reported to the process which initiated the application installation.

Unlike FIG. 3A, FIG. 3B illustrates an uninstallation process which has been configured in accordance with the present invention. Beginning in block 352, responsive to a request to uninstall an application, it can be determined whether the installation of the application component to be uninstalled depends upon the installation of other application components. Subsequently, in block 354, if it is determined that the application component does not have dependencies, in block 356, an uninstallation process can be performed—namely installed application files can be removed from their respective locations within the target computing system file structure. Additionally, the configuration of the target computing system can be reverted to the state existing prior to the installation of the application.

In block 358, an uninstallation diagnosis can be performed to determine whether the application uninstallation of block 356 has completed successfully. Specifically, the diagnosis can determine whether all requisite files have been removed as specified by the uninstallation process, and whether the system has been reverted to the proper state, according to the uninstallation process. In decision block 360, if the uninstallation process has been determined to have failed, in block 362 a cleanup process can be invoked to remove the application component. Otherwise, in block 364, to the extent that the uninstallation process has completed successfully, the uninstallation can be reported as a success.

Importantly, in decision block 354, if the installation of the application is determined to have depended upon the installation of other applications, the dependent applications also can be uninstalled before uninstalling the initial application. Specifically, in block 366, the first dependency can be identified, and in block 368 the first dependent application can be uninstalled using the same process within the dependent application as described herein in blocks 352 through 364. In decision block 370, it can be determined in block 376 whether additional dependent applications remain to be uninstalled. If so, the next dependent application can be identified in block 372 and the process of uninstalling dependent applications can continue through blocks 366 through 370. Once all dependent applications have been uninstalled, the principal application can be uninstalled in accordance with steps 352 through 368.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An application suite installer configured to install an application suite to a target computing system, the application suite comprising a plurality of application components, the installer comprising:
    installation logic configured to copy the application files to specified locations in the target computing system, and to configure the target computing system for operation with the application;
    a pre-requisite check coupled to said installation logic to identify application components required for a proper installation of the application suite;
    installation and functionality diagnostic logic coupled to said installation logic;
    first cleanup logic coupled to said installation logic, wherein said installation logic invokes installation procedures for each one the application components identified by said pre-requisite check;
    uninstallation logic configured to remove copied application files from specified locations in the target computing system, and to revert a current configuration of the target computing system to a prior configuration according to the terms of a specified uninstallation configuration file;
    uninstallation diagnostic logic coupled to said uninstallation logic; and,
    second cleanup logic coupled to said uninstallation logic, wherein
    said installation and functionality diagnostic logic configured to detect an installation failure of the application components;
    said first cleanup logic removing said copied application files and reverting said current configuration of the target computing system to the prior configuration in response to said installation diagnostic logic detecting an installation failure,
    said uninstallation diagnostic logic configured to detect an uninstallation failure, and
    in response to said uninstallation diagnostic logic detecting an uninstallation failure, said second cleanup logic removing said copied application files and reverting said current configuration of the target computing system to the prior configuration without regard to said uninstallation configuration file.

2. The application suite installer of claim 1, further comprising a meta-data reporter configured to report application meta-data for a selected one of the application components.

3. The application suite installer of claim 1, wherein the application suite installer further comprises:
    a plugable framework from which individual framework implementations of said framework are associated with corresponding ones of the application components in the application suite.

4. A method of installing an application program to a target computing system, the method comprising the steps of:
    in a first installation process:
        copying applications files of the application program to specified locations in the target computing system;
        configuring the target computing system as required for the operation of the application program;
    in a second installation process which is separate from said first installation process:
        diagnosing said copying and configuring steps to determine whether the application program has been installed successfully, and
        if in said diagnosing step it is determined that the application program has not been installed successfully, performing a first cleanup process to remove said copied application files and to reverse a current configuration to a prior configuration in a first uninstallation process:
    uninstalling the application program, said uninstallation comprising the steps of removing said copied application files, and reversing said current configuration to said prior configuration according to a specified installation configuration file; and, in a second uninstallation process:
        diagnosing said removing and reversing steps to determine whether the application program has been uninstalled successfully; and,
        if said diagnosing step of said second uninstallation process determining that the application program has not been uninstalled successfully, performing a second cleanup process to remove remaining application files and to reverse said current configuration to said prior configuration without regard to said specified installation configuration file.

5. The method of claim 4, further comprising the steps of:
    identifying dependent applications whose installation is required for the operation of the application program; and,
    installing each identified dependent application before installing the application program.

6. The method of claim 4, wherein said diagnosing step comprises the steps of:

identifying a set of application files which, for a successful installation of the application program, are to be copied to specified locations in the target computing system;

further identifying system configuration settings which are required in the target application system for the correct operation of the application program; and, detecting at least one of a failure to copy said set of application files to said specified location, and a failure to correctly establish said system configuration systems.

7. The method of claim 4, wherein said diagnosing step further comprises the steps of:

determining pre-requisite system conditions for the application program;

identifying system configuration data for the target computing system;

comparing said pre-requisite system conditions with said system configuration data; and, reporting said comparison to an end user.

8. A machine readable storage having stored thereon a computer program for installing an application program to a target computing system, the computer program comprising a routine set of instructions which when executed cause the machine to perform the steps of:

in a first installation process:

copying applications files of the application program to specified locations in the target computing system;

configuring the target computing system as required for the operation of the application program;

in a second installation process which is separate from said first installation process:

diagnosing said copying and configuring steps to determine whether the application program has been installed successfully, and if in said diagnosing step it is determined that the application program has not been installed successfully, performing a first cleanup process to remove said copied application files and to reverse a current configuration to a prior configuration; in a first uninstallation process:

uninstalling the application program, said uninstallation comprising the steps of removing said copied application files, and reversing said current configuration to said prior configuration according to a specified installation configuration file; and, in a second uninstallation process:

diagnosing said removing and reversing steps to determine whether the application program has been uninstalled successfully; and, if said diagnosing step of said second uninstallation process determining that the application program has not been uninstalled successfully, performing a second cleanup process to remove remaining application files and to reverse said current configuration to said prior configuration without regard to said specified installation configuration file.

9. The machine readable storage of claim 8, further comprising the steps of:

identifying dependent applications whose installation is required for the operation of the application program; and, installing each identified dependent application before installing the application program.

10. The machine readable storage of claim 8, wherein said diagnosing step comprises the steps of:

identifying a set of application files which, for a successful installation of the application program, are to be copied to specified locations in the target computing system;

further identifying system configuration settings which are required in the target application system for the correct operation of the application program; and, detecting at least one of a failure to copy said set of application files to said specified location, and a failure to correctly establish said system configuration systems.

11. The machine readable storage of claim 10, wherein said diagnosing step further comprises the steps of:

determining pre-requisite system conditions for the application program;

identifying system configuration data for the target computing system;

comparing said pre-requisite system conditions with said system configuration data; and, reporting said comparison to an end user.

* * * * *

UNITED STATES PATENT AND TRADEMARK OFFICE
CERTIFICATE OF CORRECTION

PATENT NO. : 7,185,335 B2
APPLICATION NO. : 10/247202
DATED : February 27, 2007
INVENTOR(S) : Hind et al.

It is certified that error appears in the above-identified patent and that said Letters Patent is hereby corrected as shown below:

On the title page (75), replace "Youngcheng Li" with --Yongcheng Li--.

Signed and Sealed this

Tenth Day of April, 2007

JON W. DUDAS
*Director of the United States Patent and Trademark Office*